US010650620B2

(12) United States Patent
Saylor et al.

(10) Patent No.: US 10,650,620 B2
(45) Date of Patent: May 12, 2020

(54) SYSTEMS AND METHODS TO DETERMINE ABNORMALITIES IN A VEHICLE STABILIZER SYSTEM

(71) Applicant: GM GLOBAL TECHNOLOGY OPERATIONS LLC, Detroit, MI (US)

(72) Inventors: Brian K. Saylor, South Lyon, MI (US); Joshua R. Auden, Brighton, MI (US); Robert P. Marble, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 119 days.

(21) Appl. No.: 15/700,728

(22) Filed: Sep. 11, 2017

(65) Prior Publication Data

US 2019/0080531 A1 Mar. 14, 2019

(51) Int. Cl.
*G07C 5/08* (2006.01)
*B60G 21/00* (2006.01)

(52) U.S. Cl.
CPC ......... *G07C 5/0816* (2013.01); *B60G 21/005* (2013.01); *B60G 2400/0511* (2013.01); *B60G 2400/104* (2013.01); *G07C 5/0808* (2013.01)

(58) Field of Classification Search
CPC G07C 5/0808; G07C 5/0816; B60C 23/0488; B60G 21/055
See application file for complete search history.

(56) References Cited

U.S. PATENT DOCUMENTS

2005/0023789 A1\* 2/2005 Suzuki ............... B60G 17/0162
280/124.106
2006/0138732 A1\* 6/2006 Buma ................ B60G 17/0162
280/5.5

\* cited by examiner

*Primary Examiner* — Abby Y Lin
*Assistant Examiner* — Renee LaRose
(74) *Attorney, Agent, or Firm* — Quinn IP Law

(57) ABSTRACT

Systems and methods to detect abnormalities within a stabilizer system for a vehicle. A method includes receiving suspension system data from one or more vehicle sensors, calculating a roll gradient from the suspension system data, determining whether the calculated roll gradient is greater than a predetermined roll gradient threshold, and setting a diagnostic notification if the calculated roll gradient is greater than the predetermined roll gradient threshold.

16 Claims, 5 Drawing Sheets

SYSTEMS AND METHODS TO DETERMINE ABNORMALITIES IN A VEHICLE STABILIZER SYSTEM

INTRODUCTION

The present invention relates generally to the field of vehicles and, more specifically, to systems and methods to determine abnormalities in one or more components of a stabilizer system.

Stabilizer bar systems are present in almost every automobile sold today. They are used to tune ride, handling, and steering and maintain vehicle roll stability during lateral movements. However, components of stabilizer bar systems, such as stabilizer bar bushings and end links, often fail, often without being noticed by the vehicle operator, leading to unsafe driving conditions.

SUMMARY

Embodiments according to the present disclosure provide a number of advantages. For example, embodiments according to the present disclosure use centrally-located vehicle sensors and/or corner displacement sensors to determine if stabilizer systems components have degraded or failed.

In one aspect, a method to detect abnormalities within a stabilizer system for a vehicle is disclosed. The method includes the steps of receiving suspension system data from one or more vehicle sensors, calculating a roll gradient from the suspension system data, determining whether the calculated roll gradient is greater than a predetermined roll gradient threshold, and setting a diagnostic notification if the calculated roll gradient is greater than the predetermined roll gradient threshold.

In some aspects, the suspension system data includes lateral acceleration and vehicle roll angle data received from one or more suspension system displacement sensors mounted near one or more corners of the vehicle.

In some aspects, the suspension system data includes lateral acceleration and vehicle roll angle data received from an inertial measurement unit of the vehicle.

In some aspects, the roll gradient is calculated as a change in the vehicle roll angle over a change in the lateral acceleration of the vehicle.

In some aspects, calculating the roll gradient includes calculating the roll gradient at predetermined intervals while the vehicle is moving to obtain a series of roll gradient calculation events.

In some aspects, the predetermined intervals are one of a predetermined time and a predetermined distance of travel of the vehicle.

In some aspects, the method further includes monitoring the series of roll gradient calculation events and monitoring a number of calculated roll gradient events above the predetermined roll gradient threshold and, if the number of calculated roll gradient events above the predetermined roll gradient threshold exceeds a predetermined roll gradient count threshold, setting a diagnostic trouble code.

In some aspects, the method further includes determining whether a difference between the calculated roll gradient and the predetermined roll gradient threshold is above a predetermined amount and if so, setting a diagnostic trouble code.

In another aspect, an automotive vehicle includes a chassis comprising an axle, a first wheel and a second wheel coupled to opposite ends of the axle, a suspension system coupled to the chassis, the suspension system including a stabilizer bar having a first end coupled to the chassis near the first wheel via a first stabilizer bar link and a second end coupled to the chassis near the second wheel via a second stabilizer bar link and at least one stabilizer bar bushing, a first suspension displacement sensor coupled to the chassis near the first wheel, a second suspension displacement sensor coupled to the chassis near the second wheel, and an electronic controller coupled to the chassis and electronically connected to the first and second suspension displacement sensors. The controller is configured to receive suspension system data from the first and second suspension displacement sensors, calculate a roll gradient from the suspension system data, determine whether the calculated roll gradient is greater than a predetermined roll gradient threshold, and transmit an indication of a possible suspension component malfunction if the calculated roll gradient is greater than the predetermined roll gradient threshold.

In some aspects, the suspension system data includes lateral acceleration and vehicle roll angle data.

In some aspects, the roll gradient is calculated as a change in the vehicle roll angle over a change in the lateral acceleration of the vehicle.

In some aspects, calculating the roll gradient includes calculating the roll gradient at predetermined intervals while the vehicle is moving to obtain a series of roll gradient calculation events.

In some aspects, the predetermined intervals are one of a predetermined time and a predetermined distance of travel of the vehicle.

In some aspects, the controller is further configured to monitor the series of roll gradient calculation events and monitor a number of calculated roll gradient events above the predetermined roll gradient threshold and, if the number of calculated roll gradient events above the predetermined roll gradient threshold exceeds a predetermined roll gradient count threshold, set a diagnostic trouble code.

In some aspects, the controller is further configured to determine whether a difference between the calculated roll gradient and the predetermined roll gradient threshold is above a predetermined amount and if so, set a diagnostic trouble code.

In yet another aspect, a system within a vehicle for detecting abnormalities within a stabilizer system of the vehicle includes one or more suspension displacement sensors, and an electronic controller. The electronic controller is configured to receive suspension system data from the one or more suspension displacement sensors, calculate a roll gradient from the suspension system data, determine whether the calculated roll gradient is greater than a predetermined roll gradient threshold, and transmit an indication of a possible suspension component malfunction if the calculated roll gradient is greater than the predetermined roll gradient threshold.

In some aspects, transmitting an indication of a possible suspension component malfunction includes one or more of setting a diagnostic trouble code and transmitting a notification to a vehicle operator.

In some aspects, the suspension system data includes lateral acceleration and vehicle roll angle data received from the one or more suspension system displacement sensors.

In some aspects, the roll gradient is calculated as a change in the vehicle roll angle over a change in the lateral acceleration of the vehicle and the controller is further configured to calculate the roll gradient at predetermined intervals while the vehicle is moving to obtain a series of roll gradient calculation events.

In some aspects, the controller is further configured to monitor the series of roll gradient calculation events and monitor a number of calculated roll gradient events above the predetermined roll gradient threshold and, if the number of calculated roll gradient events above the predetermined roll gradient threshold exceeds a predetermined roll gradient count threshold, set a diagnostic trouble code.

BRIEF DESCRIPTION OF THE DRAWINGS

The present disclosure will be described in conjunction with the following figures, wherein like numerals denote like elements.

Figure 1:
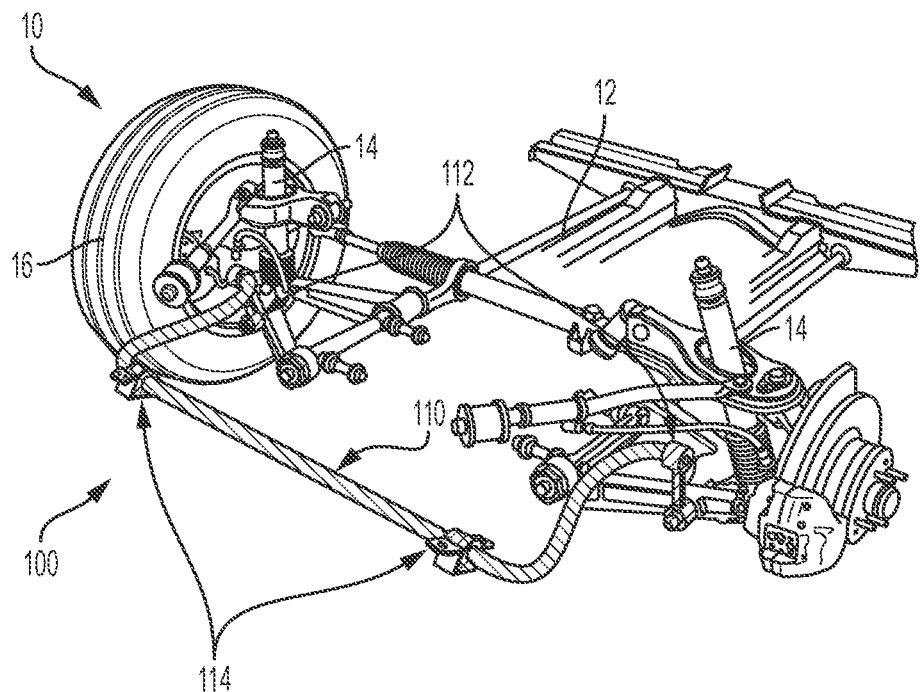
FIG. 1 is a perspective partial view of a vehicle having a suspension system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first" "second," "third," and so on may be used to describe separate components. Such terminology may include the words specifically mentioned above, derivatives thereof, and words of similar import.

Processes and systems disclosed herein use central vehicle sensors and corner suspension displacement sensors to detect abnormalities in the performance of stabilizer system components. In some embodiments, a normal acceptable amount of vehicle roll is continuously measured (roll gradient) and compared to a threshold acceptability, including a wear estimation. The determined health condition can then be used to notify the vehicle operator if service is needed.

Lateral movement of the vehicle generates lateral acceleration and vehicle body roll. The roll is proportionately related to the lateral acceleration. As stabilizer system components wear, the body roll increases slowly. When stabilizer system components fail, the body roll increases suddenly.

One or more embodiments can use a diagnostic algorithm to determine whether one or more components of the suspension system of the vehicle, including one or more stabilizer system components, is operating properly. For example, when operating an autonomous vehicle, the suspension components of the vehicle may need to be inspected/diagnosed. As such, one or more embodiments can use a diagnostic algorithm to determine whether the suspensions components of an autonomous vehicle are operating properly. The diagnosing algorithm of one or more embodiments can be applied to signals received from displacement sensors located near the corners of the vehicle or from sensors of an inertial measurement unit (IMU), for example.

A vehicle, such as the vehicle 10 partially shown in FIG. 1, includes a chassis 12, an axle 13, and at least one wheel 16. One or more suspension components may form a suspension system 100 coupled to the chassis 12 and/or the axle 13 near the wheels 16. The suspension system 100 includes, in some embodiments, one or more dampers 14 configured to dampen the effect of road-induced vibrations, such as those caused by irregular road surfaces, etc. The suspension system 100 also includes, in some embodiments, one or more stabilizer system components including a stabilizer or sway bar 110. Throughout this disclosure, the terms "stabilizer" and "sway" are used interchangeably. The sway bar 110 helps to reduce the body roll of the vehicle 10 during fast cornering or over road irregularities. The sway bar 110 connects opposite (left/right) wheels 16 together through short lever arms linked by a torsion spring. The sway bar 110 increases the roll stiffness of the suspension system 100, that is, its resistance to roll in turns, independent of its spring rate in the vertical direction.

In some embodiments, the sway bar 110 is a torsion spring that resists body roll motions. It is usually constructed from a cylindrical steel bar formed into a "U" shape that connects to the vehicle body at two points, and at the left and right sides of the suspension system 100. If the left and right vehicle wheels 16 move together, the sway bar 110 rotates about its mounting points. If the wheels 16 move relative to each other, the sway bar 110 is subjected to torsion and forced to twist. Each end of the sway bar 110 is connected to a sway bar link 112 through a flexible joint. The sway bar link 112 connects in turn to a point near the vehicle wheel 16 or axle 13, transferring forces from a heavily-loaded axle to the other side.

The suspension system 100 also includes, in some embodiments, sway bar bushings 114. In some embodiments, the sway bar bushings 114 are rubber bushings that support the sway bar 110 and absorb road irregularities and assist the suspension system 100 to keep the vehicle's body from rolling as it navigates turns. Failure or wear in the sway bar bushings 114 can lead to issues with vehicle stability, as well as increased vehicle noise.

Figure 2:
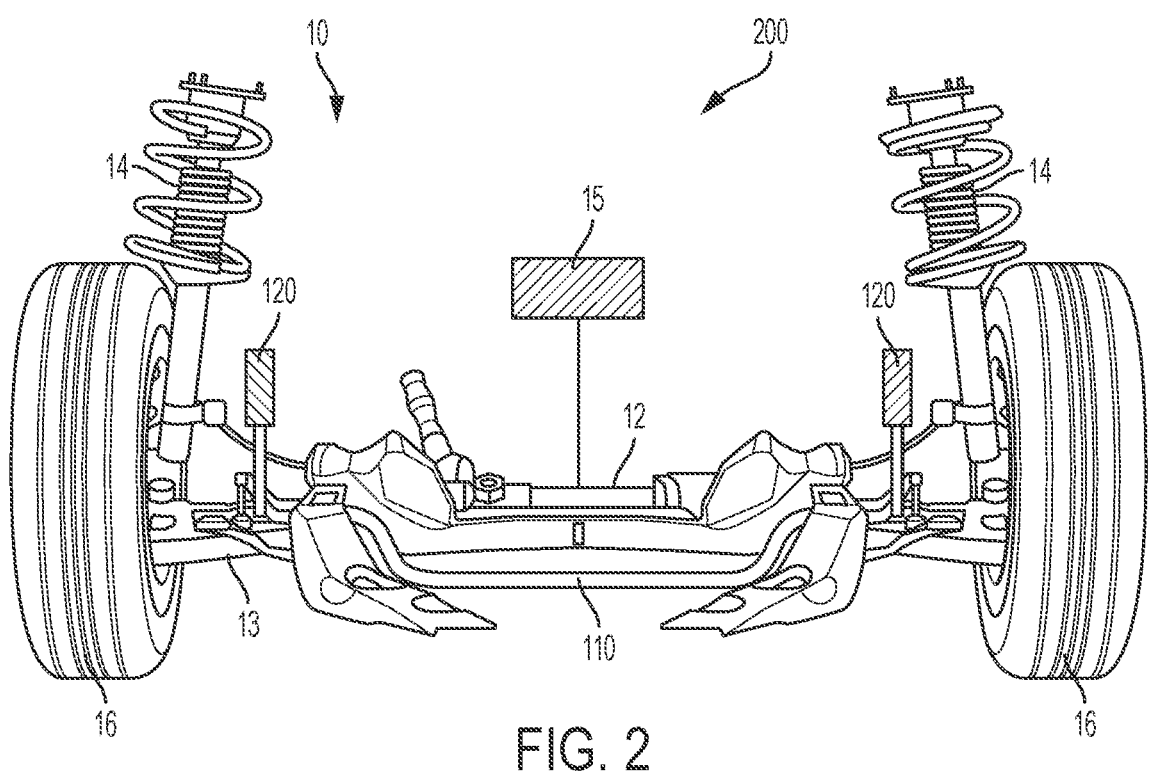
FIG. 2 is a front partial view of a vehicle having a system configured to determine whether abnormalities exist in a stabilizer system, according to an embodiment.

As shown in FIG. 2, the vehicle 10 includes a stabilizer monitoring system 200. In some embodiments, the system 200 includes one or more sensors 120. The sensors 120 are displacement sensors mounted near the corners of the vehicle 10. The sensors 120 measure a displacement of the suspension system 100 of the vehicle 10. The measured displacement is used to calculate the vehicle body roll. The sensors 120 are electronically connected to a vehicle controller, as discussed in greater detail herein. In some embodiments, the vehicle corner displacements and/or body roll is determined from data received from other vehicle sensors/accelerometers.

Additionally or alternatively, in some embodiments, the stabilizer monitoring system 200 of the vehicle 10 includes an inertial measurement unit (IMU) 15. The IMU 15 is coupled to the chassis 12. The IMU 15 is an electronic device that measures and reports the dynamically changing movements of the vehicle using a combination of accelerometers and gyroscopes. The IMU 15 provides a stream of data related to the linear acceleration of the vehicle on three principal axes, together with the three sets of rotation parameters (pitch, role, and heading) to a vehicle controller, as discussed in greater detail herein. In some embodiments, a safety data module coupled to the vehicle 10 also includes sensors capable of measuring the lateral acceleration of the vehicle 10. The safety data module is also electronically connected to the vehicle controller to transmit sensor data for further analysis and calculation, as discussed in greater detail herein.

The roll gradient of the vehicle 10 is calculated by measuring the change in roll angle over the change in lateral acceleration. That is, $$\text{Roll Gradient} = \frac{\partial \theta}{\partial a_l},$$

where $\partial \theta$ is the change in roll angle; and $\partial a_l$ is the change in lateral acceleration of the vehicle 10.

Figure 3:
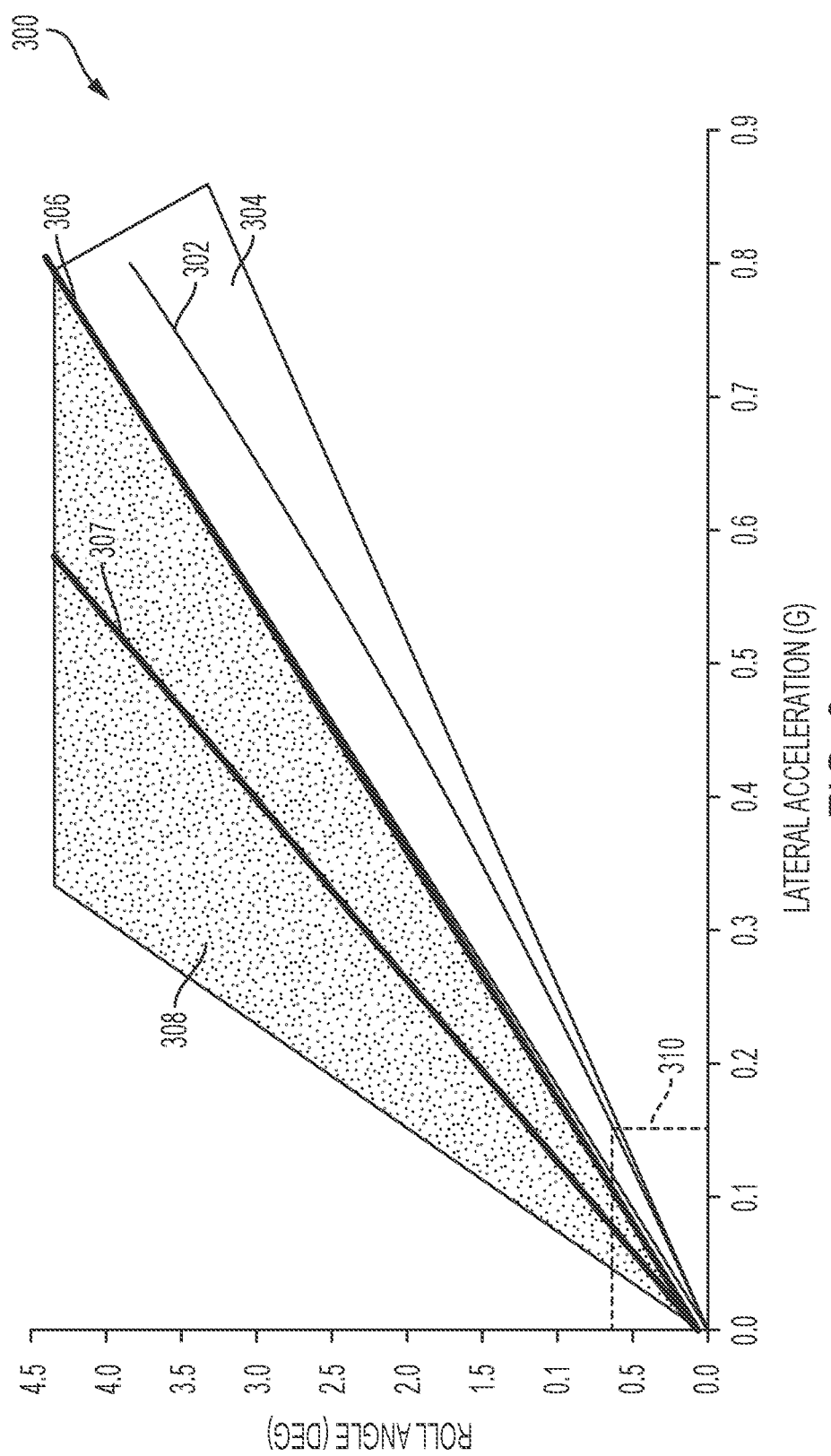
FIG. 3 is a graph illustrating a vehicle roll angle versus lateral acceleration, according to an embodiment.

The roll gradient is depicted graphically in FIG. 3. The optimum roll gradient, that is, with no vehicle body roll, is shown as line 302. An acceptable roll gradient area 304 surrounds the optimum roll gradient 302. Within the acceptable area 304, some vehicle body roll is acceptable but the movement is within a predetermined acceptable threshold for vehicle stability and suspension system health, including the health of the stabilizer system components.

A predetermined threshold 306 separates the acceptable roll gradient area 304 from an unacceptable roll gradient area 308. The unacceptable roll gradient area 308 indicates roll gradients, and thus vehicle body movement, above a predetermined unacceptable threshold for vehicle stability and suspension system health, including the health of one or more components of the suspension system 100, including one or more of the stabilizer system components. Box 310 illustrates the roll angle/lateral acceleration used to calculate the roll gradient line 302. Under typical driving conditions, and for most vehicles, the roll gradient is approximately linear and generally limited to 0.15 for most vehicle configurations. The predetermined threshold 306 and the areas 304, 308 depend on the vehicle type and/or configuration, among other considerations.

A threshold 307 falls within the unacceptable roll gradient area 308. The predetermined threshold 307 indicates a limit above which a calculated roll gradient indicates a possible failure of one or more stabilizer bar components. Calculated roll gradients above the threshold 307 indicate, in some embodiments, a possible failure of one or more of the stabilizer system components. In some embodiments, a single roll gradient calculation event above the predetermined threshold 307, indicates a potential issue with one or more of the stabilizer system components that should be evaluated and repaired or replaced. The predetermined threshold 307 depends on the vehicle type and/or configuration, among other considerations.

If a stabilizer system component, such as the stabilizer bar links 112 or stabilizer bar bushings 114, degrade or fail, the vehicle operator may not be aware of an issue with the suspension system. The degradation and/or failure of one or more stabilizer system components could lead to undesired vehicle instability. That is, the degradation or failure of one or more stabilizer system components results in the calculated roll gradient of the vehicle falling in the unacceptable roll gradient area 308 which triggers a diagnostic code and/or a notification to the vehicle operator.

To determine if one or more suspension system components, such as the stabilizer bar links 112 or the stabilizer bar bushings 114, have failed or have degraded performance to the extent that service is recommended or required, in some embodiments the roll gradient is calculated at prescribed intervals, such as after the vehicle has traveled a predetermined distance or after a predetermined time and is compared to the predetermined thresholds 306, 307.

Figure 4:
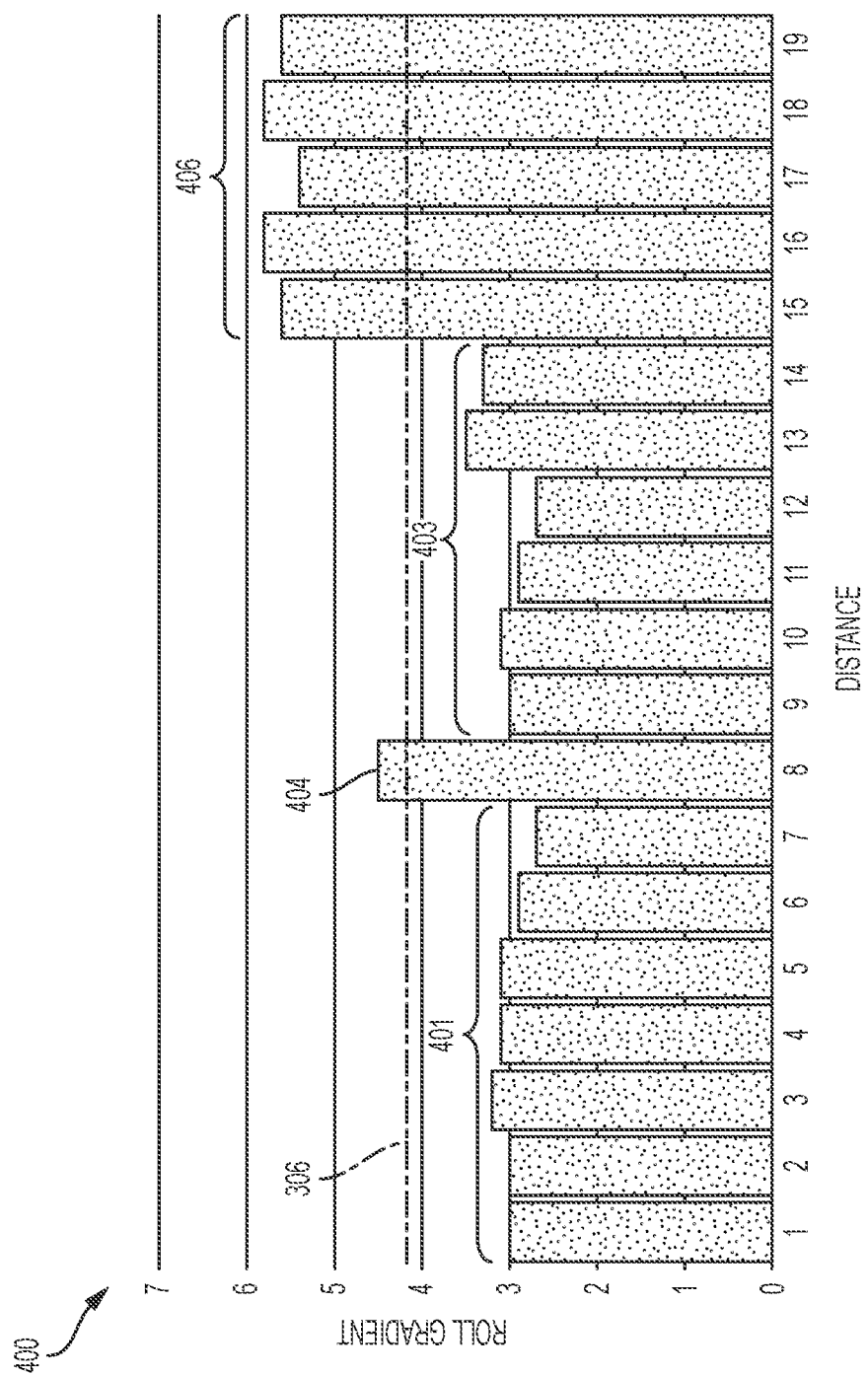
FIG. 4 is a graph illustrating a vehicle roll gradient measured at specified intervals, according to an embodiment.

FIG. 4 graphically illustrates the roll gradient calculated at predetermined distance intervals, such as after each mile of travel as measured by a vehicle odometer. As illustrated by the groups 401, 403, the roll gradient in these groups falls below the predetermined threshold 306. A single event 404 illustrates a roll gradient above the threshold 306. For a single event such as event 404, a roll gradient higher than the threshold may not indicate a service or replacement condition of one or more suspension components, specifically if the single event is followed by a group of roll gradient calculations below the threshold 306, such as the group 403. In some embodiments, a single event such as event 404 may be safely ignored as an isolated event that does not trigger a notification to the vehicle operator of a possible suspension condition, such as an issue with one or more stabilizer system components.

A group of events 406 indicates a series of measured roll gradient events above the threshold 306. Multiple roll gradient events above the predetermined threshold 306 indicate a possible suspension system condition and, according to some embodiments, trigger a notification to the vehicle operator to either service or replace one or more stabilizer system components, depending, for example and without limitation, on the magnitude of the difference between the measured roll gradient and the roll gradient threshold 306 and/or the number of roll gradient events above the threshold 306.

Figure 5:
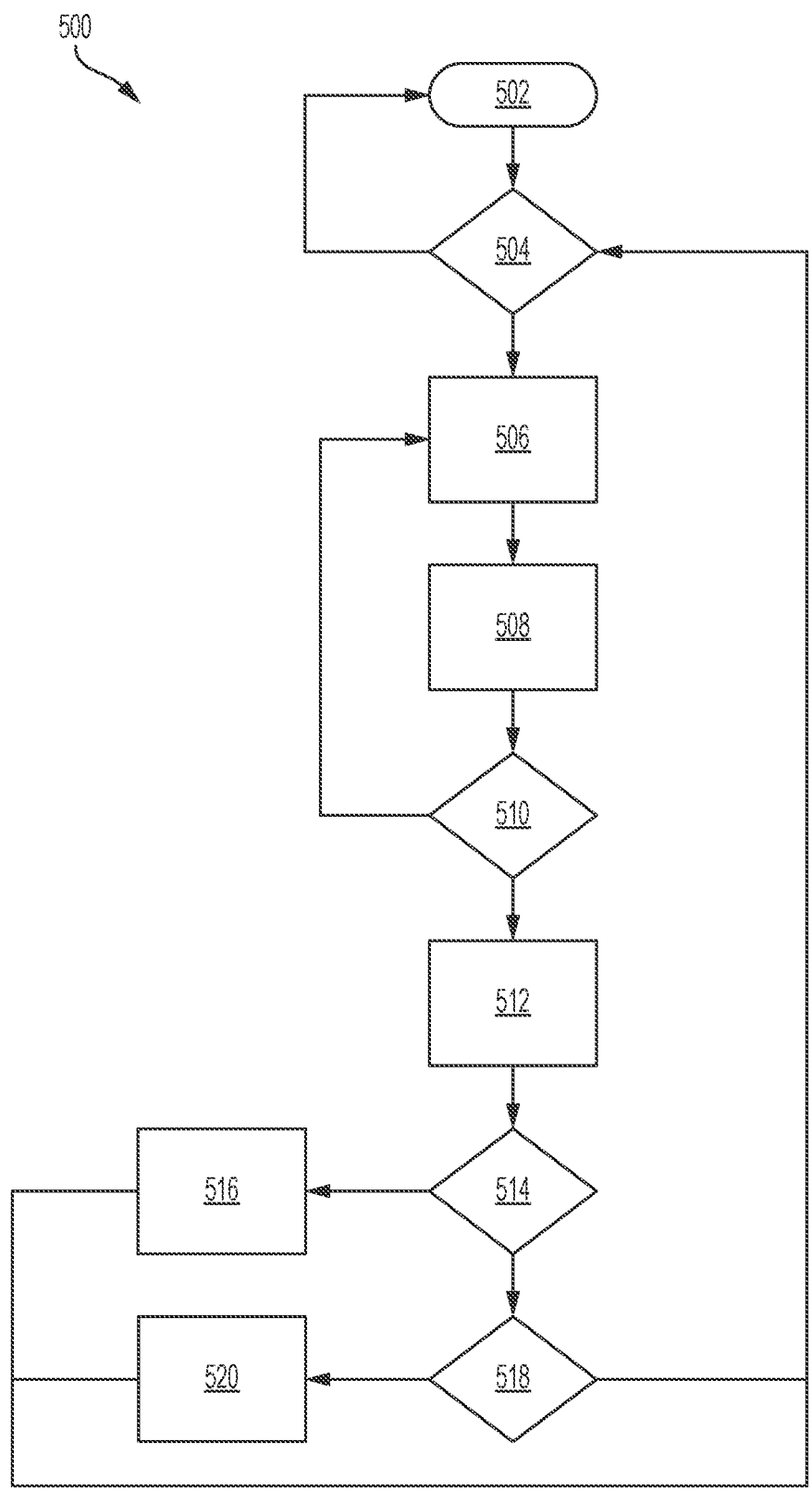
FIG. 5 is a schematic flow diagram illustrating a method to determine whether abnormalities exist in a stabilizer system, according to an embodiment.

FIG. 5 illustrates a method 500 to determine whether one or more stabilizer system components, such as the stabilizer bar 110, stabilizer bar bushings 114, and stabilizer bar links 112 are functioning properly to provide acceptable vehicle stability. The method 500 can be utilized in connection with a vehicle having one or more sensors, such as the vehicle 10. The method 500 can be utilized in connection with a controller or vehicle electronic control unit (ECU) as discussed herein, or by other systems associated with or separate from the vehicle 10, in accordance with exemplary embodiments. The order of operation of the method 500 is not limited to the sequential execution as illustrated in FIG. 5 but may be performed in one or more varying orders, or steps may be performed simultaneously, as applicable in accordance with the present disclosure.

As shown in FIG. 5, the method 500 starts at 502 and proceeds to 504. At 504, the controller determines whether the vehicle 10 is moving. For example, in some embodiments, a vehicle speed sensor associated with the controller or ECU determines whether the vehicle speed is above a predetermined threshold, such as 5 kph. If the vehicle is not moving, the method 500 returns to the start at 502. If the vehicle 10 is moving, the method 500 proceeds to 506.

At 506, for vehicles having an inertial measurement unit (IMU) 15, the controller receives a continuous record of vehicle lateral acceleration data and vehicle roll angle data from the IMU 15. For vehicles having displacement sensors, the controller receives a continuous stream of suspension displacement data from one or more of the displacement sensors 120.

From the displacement data and/or the vehicle lateral acceleration and vehicle roll angle data, at 508, the controller calculates the roll gradient for each predetermined interval, as discussed herein. Using the calculated roll gradient, the controller determines, at 510, whether the roll gradient is above or below the predetermined roll gradient threshold, as illustrated in FIGS. 3 and 4.

If the roll gradient is below the predetermined threshold 306 and falls within the acceptable roll gradient area 304 shown in FIG. 3, the method 500 returns to 506 and proceeds as discussed herein. However, if the roll gradient is above the predetermined threshold 306 and falls within the unacceptable roll gradient area 308 shown in FIG. 3, the method 500 proceeds to 512. At 512, the controller increases a roll gradient counter by one. The controller monitors the roll gradient counter to determine if a series of calculated roll gradients are above or below the predetermined roll gradient threshold.

After increasing the roll gradient counter, the method 500 proceeds to 514. At 514, the controller determines whether the roll gradient count is above a predetermined value. In some embodiments, for example, the predetermined value is 10 counts over a predetermined interval, such as the last 10 miles of operation or in a single key cycle. In other embodiments, the predetermined value of counts could be more or fewer than 10, such as, for example and without limitation, 5, 8, 12, 15, or more counts over a specified time or distance interval. As discussed herein with respect to FIG. 4, a series of roll gradient calculations above the predetermined threshold 306 indicates a possible issue with one or more stabilizer bar components.

If the roll gradient count is above the predetermined value, the method 500 proceeds to 516 and transmits an indication of a possible suspension component malfunction, such as, for example and without indication, setting a diagnostic trouble code (DTC). The diagnostic trouble code indicates a possible issue with one or more stabilizer system components. In some embodiments, the vehicle operator is notified of the possible issue and may be instructed to direct the vehicle to a service facility for evaluation of one or more of the stabilizer system components.

If the roll gradient count is not above the predetermined value, the method 500 proceeds to 518. At 518, the controller determines whether the calculated roll gradient is above a higher threshold, such as the threshold 307 shown in FIG. 3. In other embodiments, the controller determines whether the calculated roll gradient is above the predetermined threshold 306 by a predetermined amount. If the roll gradient is above the higher threshold 307 or above the threshold 306 by a predetermined amount, the roll gradient indicates a possible failure of one or more stabilizer system components and at 520 the controller transmits an indication of a possible suspension component issue such as, for example, setting a DTC. In some embodiments, the vehicle operator is notified of the possible issue and may be instructed to direct the vehicle to a service facility for evaluation and repair of one or more of the stabilizer system components.

From both 516 and 520, the method 500 returns to 504 and the method 500 proceeds as discussed herein.

Figure 6:
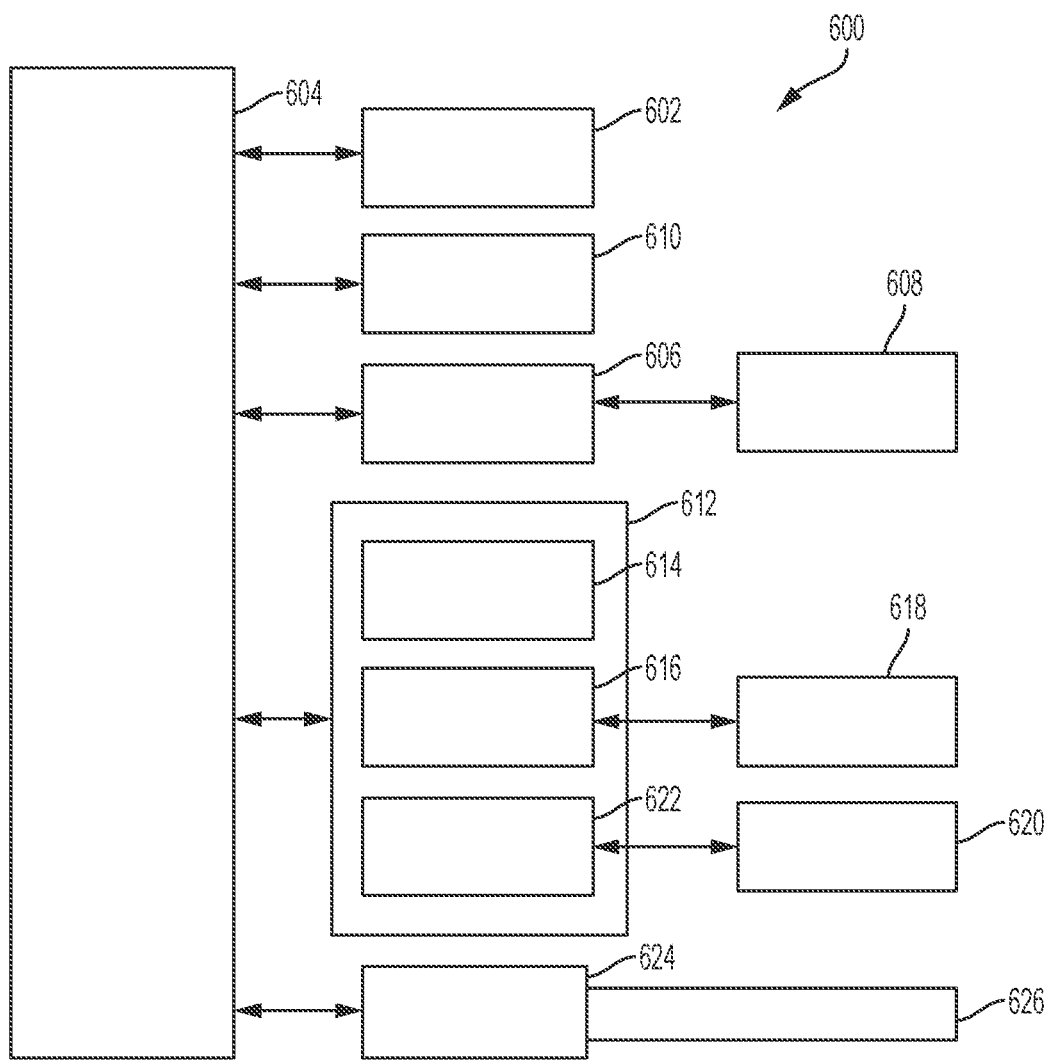
FIG. 6 is a high-level block diagram of a computing system, which can be used to implement one or more embodiments.

FIG. 6 depicts a high-level block diagram of a computing system 600, which can be used to implement one or more embodiments. The computing system 600 can correspond to, at least, an electronic processing device/controller of a vehicle, such as vehicle 10, for example. The electronic processing device can be a part of an embedded system of electronics within a vehicle. With one or more embodiments, the computing system 600 can correspond to an electronic control module or electronic control unit (ECU) of a vehicle. The computing system 600 can be used to implement hardware components of systems capable of performing methods described herein. Although one exemplary computing system 600 is shown, the computing system 600 includes a communication path 626, which connects the computing system 600 to additional systems (not depicted). The computing system 600 and additional systems are in communication via the communication path 626, e.g., to communicate data between them.

The computing system 600 includes one or more processors, such as processor 602. The processor 602 is connected to a communication infrastructure 604 (e.g., a communications bus, cross-over bar, or network). The computing system 600 can include a display interface 606 that forwards graphics, textual content, and other data from the communication infrastructure 604 (or from a frame buffer not shown) for display on a display unit 608. The display unit 608 can correspond to at least a portion of a dashboard of a vehicle, for example. The computing system 600 also includes a main memory 610, preferably random access memory (RAM), and can also include a secondary memory 612. There also can be one or more disk drives 614 contained within the secondary memory 612. Removable storage drive 616 reads from and/or writes to a removable storage unit 618. As will be appreciated, the removable storage unit 618 includes a computer-readable medium having stored therein computer software and/or data.

In alternative embodiments, the secondary memory 612 can include other similar means for allowing computer programs or other instructions to be loaded into the computing system. Such means can include, for example, a removable storage unit 620 and an interface 622.

In the present description, the terms "computer program medium," "computer usable medium," and "computer-readable medium" are used to refer to media such as the main memory 610 and the secondary memory 612, the removable storage drive 616, and a disk installed in disk drive 614. Computer programs (also called computer control logic) are stored in the main memory 610 and/or the secondary memory 612. Computer programs also can be received via the communications interface 624. Such computer programs, when run, enable the computing system to perform the features discussed herein. In particular, the computer programs, when run, enable the processor 602 to perform the features of the computing system. Accordingly, such computer programs represent controllers of the computing system. Thus it can be seen from the forgoing detailed description that one or more embodiments provide technical benefits and advantages.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method to detect abnormalities within a stabilizer system for a vehicle, the method comprising:
   receiving suspension system data from one or more vehicle sensors, the suspension system data including lateral acceleration of the vehicle and vehicle roll angle data;
   calculating a roll gradient from the suspension system data, the roll gradient calculated as a change in the vehicle roll angle over a change in the lateral acceleration of the vehicle;
   determining whether the calculated roll gradient is greater than a predetermined roll gradient threshold; and
   setting a diagnostic notification if the calculated roll gradient is greater than the predetermined roll gradient threshold.

2. The method of claim 1, wherein the suspension system data is received from one or more suspension system displacement sensors mounted near one or more corners of the vehicle.

3. The method of claim 1, wherein the suspension system data is received from an inertial measurement unit of the vehicle.

4. The method of claim 1, wherein calculating the roll gradient comprises calculating the roll gradient at predetermined intervals while the vehicle is moving to obtain a series of roll gradient calculation events.

5. The method of claim 4, wherein the predetermined intervals are one of a predetermined time and a predetermined distance of travel of the vehicle.

6. The method of claim 5 further comprising monitoring the series of roll gradient calculation events and monitoring a number of calculated roll gradient events above the predetermined roll gradient threshold and, if the number of calculated roll gradient events above the predetermined roll gradient threshold exceeds a predetermined roll gradient count threshold, setting a diagnostic trouble code.

7. The method of claim 4 further comprising determining whether a difference between the calculated roll gradient and the predetermined roll gradient threshold is above a predetermined amount and if so, setting a diagnostic trouble code.

8. An automotive vehicle, comprising:
   a chassis comprising an axle;
   a first wheel and a second wheel coupled to opposite ends of the axle;
   a suspension system coupled to the chassis, the suspension system comprising a stabilizer bar having a first end coupled to the chassis near the first wheel via a first stabilizer bar link and a second end coupled to the chassis near the second wheel via a second stabilizer bar link and at least one stabilizer bar bushing;
   a first suspension displacement sensor coupled to the chassis near the first wheel;
   a second suspension displacement sensor coupled to the chassis near the second wheel;
   an electronic controller coupled to the chassis and electronically connected to the first and second suspension displacement sensors, the electronic controller configured to
      receive suspension system data from the first and second suspension displacement sensors, the suspension system data including lateral acceleration of the automotive vehicle and vehicle roll angle;
      calculate a roll gradient from the suspension system data, the roll gradient calculated as a change in the vehicle roll angle over a change in the lateral acceleration of the automotive vehicle;
      determine whether the calculated roll gradient is greater than a predetermined roll gradient threshold; and
      transmit an indication of a possible suspension component malfunction if the calculated roll gradient is greater than the predetermined roll gradient threshold.

9. The automotive vehicle of claim 8, wherein calculating the roll gradient comprises calculating the roll gradient at predetermined intervals while the automotive vehicle is moving to obtain a series of roll gradient calculation events.

10. The automotive vehicle of claim 9, wherein the predetermined intervals are one of a predetermined time and a predetermined distance of travel of the automotive vehicle.

11. The automotive vehicle of claim 10, wherein the electronic controller is further configured to monitor the series of roll gradient calculation events and monitor a number of calculated roll gradient events above the predetermined roll gradient threshold and, if the number of calculated roll gradient events above the predetermined roll gradient threshold exceeds a predetermined roll gradient count threshold, set a diagnostic trouble code.

12. The automotive vehicle of claim 9, wherein the electronic controller is further configured to determine whether a difference between the calculated roll gradient and the predetermined roll gradient threshold is above a predetermined amount and if so, set a diagnostic trouble code.

13. A system within a vehicle for detecting abnormalities within a stabilizer system of the vehicle, comprising:
   one or more suspension system displacement sensors; and
   an electronic controller configured to
      receive suspension system data from the one or more suspension displacement sensors;
      calculate a roll gradient from the suspension system data, the roll gradient calculated as a change in the vehicle roll angle over a change in a lateral acceleration of the vehicle;
      determine whether the calculated roll gradient is greater than a predetermined roll gradient threshold; and
      transmit an indication of a possible suspension component malfunction if the calculated roll gradient is greater than the predetermined roll gradient threshold, wherein transmitting the indication of the possible suspension component malfunction comprises one or more of setting a diagnostic trouble code and transmitting a notification to a vehicle operator.

14. The system of claim 13, wherein the suspension system data includes lateral acceleration and vehicle roll angle data received from the one or more suspension system displacement sensors.

15. The system of claim 14, wherein the electronic controller is further configured to calculate the roll gradient at predetermined intervals while the vehicle is moving to obtain a series of roll gradient calculation events.

16. The system of claim 15, wherein the electronic controller is further configured to monitor the series of roll gradient calculation events and monitor a number of calculated roll gradient events above the predetermined roll gradient threshold and, if the number of calculated roll gradient events above the predetermined roll gradient threshold exceeds a predetermined roll gradient count threshold, set a diagnostic trouble code.

\* \* \* \* \*